US010452493B2

United States Patent
Yuce et al.

(10) Patent No.: US 10,452,493 B2
(45) Date of Patent: Oct. 22, 2019

(54) MICROPROCESSOR FAULT DETECTION AND RESPONSE SYSTEM

(71) Applicant: Virginia Polytechnic Institute and State University, Blacksburg, VA (US)

(72) Inventors: Bilgiday Yuce, Blacksburg, VA (US); Nahid Farhady Ghalaty, Blacksburg, VA (US); Patrick R. Schaumont, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 206 days.

(21) Appl. No.: 15/596,876

(22) Filed: May 16, 2017

(65) Prior Publication Data

US 2017/0344438 A1    Nov. 30, 2017

Related U.S. Application Data

(60) Provisional application No. 62/340,613, filed on May 24, 2016.

(51) Int. Cl.
*G06F 11/26* (2006.01)
*G06F 11/14* (2006.01)
(Continued)

(52) U.S. Cl.
CPC .......... *G06F 11/1469* (2013.01); *G06F 11/26* (2013.01); *G06F 21/71* (2013.01); *G06F 21/72* (2013.01); *G06F 2201/805* (2013.01)

(58) Field of Classification Search
CPC ......... G06F 11/26; G06F 11/263; G06F 21/71
See application file for complete search history.

(56) References Cited

U.S. PATENT DOCUMENTS 4,933,941 A * 6/1990 Eckard ................ G06F 11/2236
714/31
4,996,688 A * 2/1991 Byers ............. G01R 31/318536
714/41

(Continued)

OTHER PUBLICATIONS

Yuce et al. "FAME: Fault-Attack Aware Microprocessor Extensions for Hardware Fault Detection and Software Fault Response" ACM. Jun. 2016.*

(Continued)

*Primary Examiner* — Yolanda L Wilson
(74) *Attorney, Agent, or Firm* — Withrow & Terranova, P.L.L.C.

(57) ABSTRACT

Aspects disclosed in the detailed description include a microprocessor fault detection and response system. The microprocessor fault detection and response system utilizes a hardware-based fault-attack aware microprocessor extension (FAME) and a software-based trap handler for detecting and responding to a fault injection on a microprocessor. Upon detecting the fault injection, the hardware FAME switches the microprocessor from a normal mode to a safe mode and instructs the microprocessor to invoke the software-based trap handler in the safe mode. The hardware-based FAME provides fault recovery information to the software-based trap handler via a fault recovery register (FRR) for restoring the microprocessor to a fault-free state. By utilizing a combination of the hardware-based FAME and the software-based trap handler, it is possible to effectively protect the microprocessor from malicious fault attacks without significantly increasing performance and area overheads.

19 Claims, 11 Drawing Sheets

(51) Int. Cl.
*G06F 21/71* (2013.01)
*G06F 21/72* (2013.01)

(56) References Cited

U.S. PATENT DOCUMENTS

| | | | | |
|---|---|---|---|---|
| 5,046,068 A * | 9/1991 | Kubo | ............... | G06F 11/1691 |
| | | | | 714/25 |
| 5,748,873 A * | 5/1998 | Ohguro | ............... | G06F 11/165 |
| | | | | 714/10 |
| 6,167,479 A * | 12/2000 | Hartnett | ............... | G06F 9/30065 |
| | | | | 710/260 |
| 7,020,803 B2 * | 3/2006 | Wolin | ............... | G06F 11/2215 |
| | | | | 714/25 |
| 7,089,456 B2 * | 8/2006 | Gender | ............... | G06F 11/3688 |
| | | | | 714/38.1 |
| 8,046,639 B1 * | 10/2011 | Nordin | ............... | G06F 11/2268 |
| | | | | 714/32 |
| 9,208,043 B1 * | 12/2015 | Tseng | ............... | G06F 11/263 |
| 2004/0243882 A1 * | 12/2004 | Zhou | ............... | G06F 11/36 |
| | | | | 714/38.1 |
| 2007/0260950 A1 * | 11/2007 | Morrison | ....... | G01R 31/318536 |
| | | | | 714/726 |
| 2008/0215925 A1 * | 9/2008 | Degenaro | ............... | G06F 11/263 |
| | | | | 714/41 |
| 2008/0239942 A1 * | 10/2008 | Hsu | ............... | G06F 11/26 |
| | | | | 370/216 |
| 2010/0218058 A1 * | 8/2010 | Somasundaram | ............... | G01R 31/31706 |
| | | | | 714/724 |
| 2015/0212923 A1 * | 7/2015 | Sugiyama | ............... | G06F 11/3644 |
| | | | | 714/38.1 |

OTHER PUBLICATIONS

Yuce et al. "A Secure Exception Mode for Fault-Attack-Resistant Processing". IEEE. Aug. 2015.*

Yuce, Bilgiday et al., "FIRST: Fault Injection Response using Secure Traps," Bradley Department of Electrical and Computer Engineering, Date Unknown, Virginia Tech, Blacksburg, USA, 7 pages.

Yuce, Bilgiday et al., "Improving Fault Attacks on Embedded Software using RISC Pipeline Characterization," Workshop on Fault Diagnosis and Tolerance in Cryptography (FDTC), Sep. 13, 2015, St. Malo, France, IEEE, 11 pages.

Yuce, Bilgiday et al., "Task 2552.001—Report on LEON3 FPGA testbed demonstration and fault attack detection methodology," Virginia Tech, Deliverable Report, 2015, Semiconductor Research Corporation, 3 pages.

* cited by examiner

SOFTWARE DOMAIN 12
- INPUT REDUNDANCY, BLINDING
- CHECKPOINTING
- ALGORITHMIC REDUNDANCY
- INSTRUCTION REDUNDANCY

HARDWARE DOMAIN 14
- MICRO-OPERATION PROTECTION
- HARDWARE REDUNDANCY, CED
- STANDBY SPARING

FIG. 1

MICROPROCESSOR FAULT DETECTION AND RESPONSE SYSTEM

PRIORITY APPLICATION

This application claims the benefit of provisional patent application Ser. No. 62/340,613, filed May 24, 2016, the disclosure of which is hereby incorporated herein by reference in its entirety.

GOVERNMENT SUPPORT

This invention was made with government funds under grant number 1441710 awarded by the National Science Foundation. The U.S. Government may have certain rights in this invention.

FIELD OF THE DISCLOSURE

The technology of the disclosure relates generally to detecting and responding to malicious fault attacks on microprocessors.

BACKGROUND

Over the past fifteen years, malicious fault attacks on microprocessors and/or embedded electronic systems have grown from a crypto-engineering curiosity into a systematic adversarial technique against secure hardware and software. Fault attacks use well-chosen, targeted fault injection combined with clever system response analysis to break the security of the embedded electronic system. Traditional fault attacks assume a fault model derived from the fault injection technique, and infer internal system secrets by analyzing the observed faulty system response and a difference to the known correct result.

More recently, malicious faults have also been recognized as a source of side-channel leakage. These so-called biased fault attacks detect the onset of faults as a function of fault injection intensity and internal secret variables. The biased faults then test the value of the internal secrets using hypothesis testing. The biased fault attacks use fault models that are less strict than traditional fault attacks. The biased fault attacks underline the growing need for a comprehensive countermeasure against fault attacks in hardware and software. Moreover, defending software against fault attacks may be difficult as the faults may originate in underlying processor hardware that supports the software. In this regard, it may be desired to provide more robust and cost effective fault countermeasures that can recover the processor hardware from fault attacks.

SUMMARY

Aspects disclosed in the detailed description include a microprocessor fault detection and response system. The microprocessor fault detection and response system utilizes a hardware-based fault-attack aware microprocessor extension (FAME) and a software-based trap handler for detecting and responding to a fault injection on a microprocessor. Upon detecting the fault injection, the hardware FAME switches the microprocessor from a normal mode to a safe mode and instructs the microprocessor to invoke the software-based trap handler in the safe mode. The hardware-based FAME provides fault recovery information to the software-based trap handler via a fault recovery register (FRR) for restoring the microprocessor to a fault-free state. By utilizing a combination of the hardware-based FAME and the software-based trap handler, it is possible to effectively protect the microprocessor from malicious fault attacks without significantly increasing performance and area overheads.

In one aspect, a microprocessor fault detection and response system is provided. The microprocessor fault detection and response system includes a microprocessor configured to operate in a normal mode and a safe mode. The microprocessor fault detection and response system also includes a hardware-based FAME coupled to the microprocessor. The hardware-based FAME is configured to detect a fault injection on the microprocessor when the microprocessor operates in the normal mode to execute one or more instructions in an instruction datapath based on a clock signal having repeating clock cycles. The hardware-based FAME is also configured to store fault recovery information in a FRR. The hardware-based FAME is also configured to switch the microprocessor from the normal mode to the safe mode. The hardware-based FAME is also configured to instruct the microprocessor to invoke a software-based trap handler in the safe mode. The software-based trap handler is configured to retrieve the fault recovery information from the FRR. The software-based trap handler is also configured to restore the microprocessor to a fault-free state based on the fault recovery information.

In another aspect, a method for protecting a microprocessor from fault injections is provided. The method includes detecting a fault injection on a microprocessor when the microprocessor operates in a normal mode to execute one or more instructions in an instruction datapath based on a clock signal having repeating clock cycles. The method also includes storing fault recovery information in a FRR. The method also includes switching the microprocessor from the normal mode to a safe mode. The method also includes instructing the microprocessor to invoke a software-based trap handler in the safe mode. The method also includes retrieving the fault recovery information from the FRR by the software-based trap handler. The method also includes restoring the microprocessor to a fault-free state based on the fault recovery information.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 1 is a schematic diagram of an exemplary traditional fault tolerance configuration for countering malicious fault attacks;

DETAILED DESCRIPTION

Figure 2:
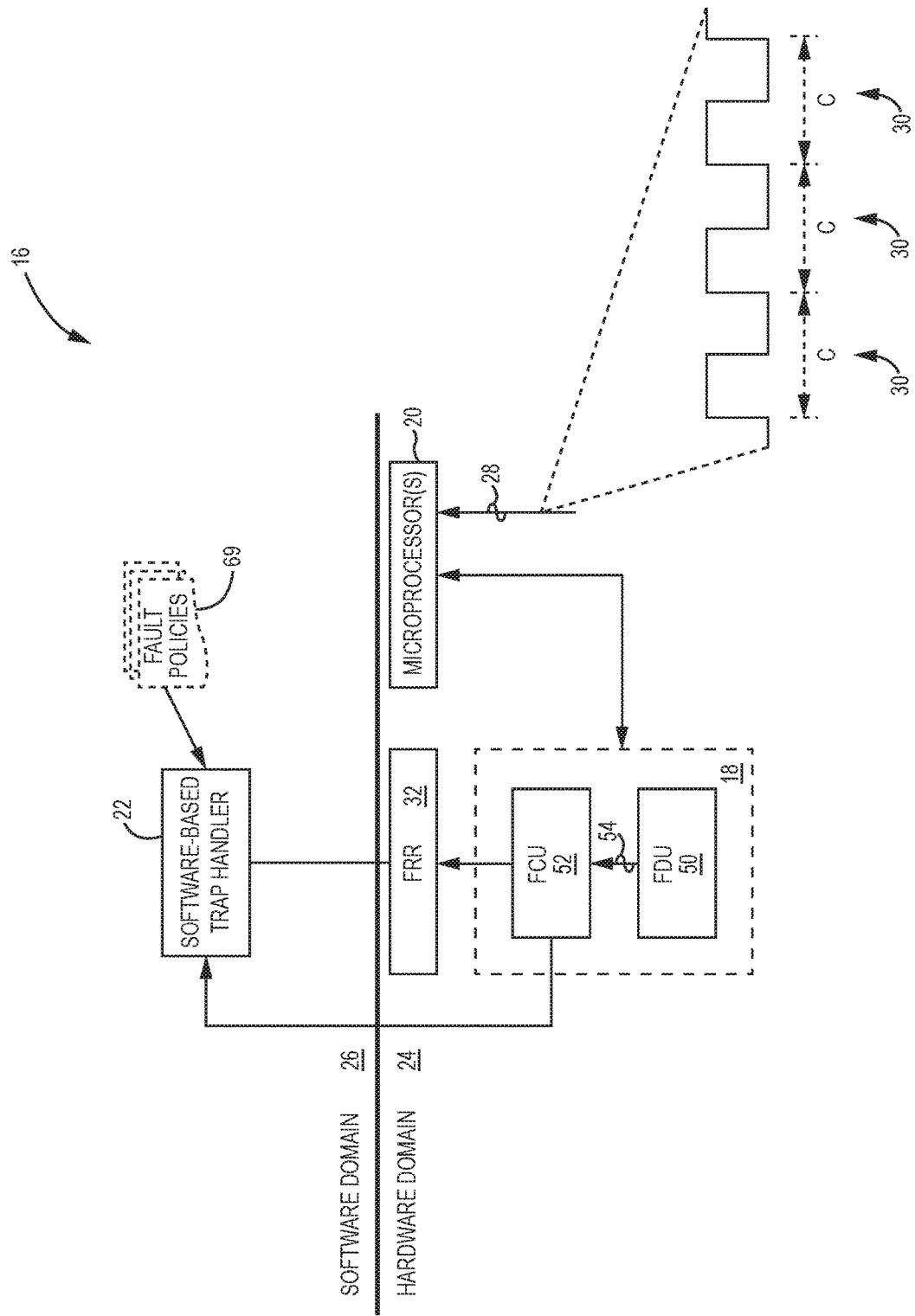
FIG. 2 is a schematic diagram of an exemplary microprocessor fault detection and response system including a hardware-based fault-attack aware microprocessor extension (FAME) configured to detect a malicious fault injection in a microprocessor and a software-based trap handler configured to respond to the detected malicious fault injection.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below," "above," "upper," "lower," "horizontal," and/or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Aspects disclosed in the detailed description include a microprocessor fault detection and response system. The microprocessor fault detection and response system utilizes a hardware-based fault-attack aware microprocessor extension (FAME) and a software-based trap handler for detecting and responding to a fault injection on a microprocessor. Upon detecting the fault injection, the hardware FAME switches the microprocessor from a normal mode to a safe mode and instructs the microprocessor to invoke the software-based trap handler in the safe mode. The hardware-based FAME provides fault recovery information to the software-based trap handler via a fault recovery register (FRR) for restoring the microprocessor to a fault-free state. By utilizing a combination of the hardware-based FAME and the software-based trap handler, it is possible to effectively protect the microprocessor from malicious fault attacks without significantly increasing performance and area overheads.

Before discussing the microprocessor fault detection and response system of the present disclosure, an overview of a traditional fault tolerance configuration for countering malicious fault attacks is first provided with reference to FIG. 1. The discussion of specific exemplary aspects of a microprocessor fault detection and response system starts below with reference to FIG. 2.

In this regard, FIG. 1 is a schematic diagram of an exemplary traditional fault tolerance configuration 10 for countering malicious fault attacks. The fundamental technique of the traditional fault tolerance configuration 10 is to enable fault tolerance in a microprocessor by applying layered redundancy, verifying redundant executions for faults, and restoring a correct system state after fault detection. Fault detection and response according to the traditional fault tolerance configuration 10 can be implemented either completely in a software domain 12, or completely in a hardware domain 14. Examples of software fault tolerance countermeasures include information redundancy (e.g., checksum bits) on input argument, algorithmic redundancy, and instruction doubling. More specifically, each instruction may be executed twice, and a fault may be detected if the instruction yields two sets of mismatching results. Detected faults can be corrected by rolling back to a previously stored checkpoint. Given that each instruction is executed twice, such software fault-tolerant techniques typically incur significant performance overhead to establish detection of a faulty value, and require specifically prepared application software in the software domain 12.

In the hardware domain 14, there is a similar collection of application-agnostic hardware fault countermeasures. The hardware fault countermeasures may include concurrent error detection (CED) on redundant hardware modules, protected micro-operations, and standby redundant spare modules. Typically, the hardware fault countermeasures are supported by redundant hardware modules such as microprocessors. For example, two microprocessors can be configured to execute the same instruction concurrently, and a fault may be detected if the instruction executed by the two microprocessors yields two sets of mismatching results. Notably, the redundant hardware modules need to be self-contained, and therefore may incur significant area overhead.

As described above, the traditional fault tolerance configuration 10 relies on redundant instruction executions in the software domain 12 and/or redundant hardware modules in the hardware domain 14, which may introduce significant performance and/or area overhead. As such, it may be desired to provide a robust microprocessor fault detection and response system to effectively protect a microprocessor(s) from malicious fault attack, without significantly increasing performance and/or area overhead.

In this regard, FIG. 2 is a schematic diagram of an exemplary microprocessor fault detection and response system 16 including a hardware-based FAME 18 configured to detect a malicious fault injection in a microprocessor 20 and a software-based trap handler 22 configured to respond to the detected malicious fault injection. In contrast to the traditional fault tolerance configuration 10 of FIG. 1, the microprocessor fault detection and response system 16 utilizes a combination of the hardware-based FAME 18 in a hardware domain 24 and the software-based trap handler 22 in a software domain 26 to detect and respond to the malicious fault injection that may occur to the microprocessor 20.

As is further discussed below, the hardware-based FAME 18 can detect a fault injection when the microprocessor 20 operates in a normal mode, in which the microprocessor 20 is configured to execute one or more instructions in an instruction datapath based on a clock signal 28 having repeating clock cycles 30. In response to detecting the fault injection, the hardware-based FAME 18 stores fault recovery information in a FRR 32. Subsequently, the hardware-based FAME 18 switches the microprocessor 20 from the normal mode to a safe mode and instructs the microprocessor 20 to invoke the software-based trap handler 22 in the safe mode. Upon being invoked by the microprocessor 20, the software-based trap handler 22 retrieves the fault recovery information from the FRR 32 and restores the microprocessor 20 to a fault-free state based on the fault recovery information. In this regard, the FRR 32 provides an interface between the hardware-based FAME 18 and the software-based trap handler 22 to enable a secure transition from the hardware domain 24 to the software domain 26 in the event of the fault injection.

The hardware overhead of the microprocessor fault detection and response system 16 is limited to the hardware-based FAME 18 and the FRR 32, which is lower than the hardware elements required to support the traditional fault tolerance configuration 10 of FIG. 1. The software overhead of the microprocessor fault detection and response system 16 depends on the complexity of the software-based trap handler 22, but will be smaller than the software overhead associated with the traditional fault tolerance configuration 10. As such, by utilizing a combination of the hardware-based FAME 18 and the software-based trap handler 22, it is possible to effectively protect the microprocessor 20 from malicious fault injections without significantly increasing performance and area overheads. Furthermore, the microprocessor fault detection and response system 16 can be backward compatible with existing applications because fault response is handled solely by the software-based trap handler 22, which is kept separate from the applications running on the microprocessor 20.

Figure 3:
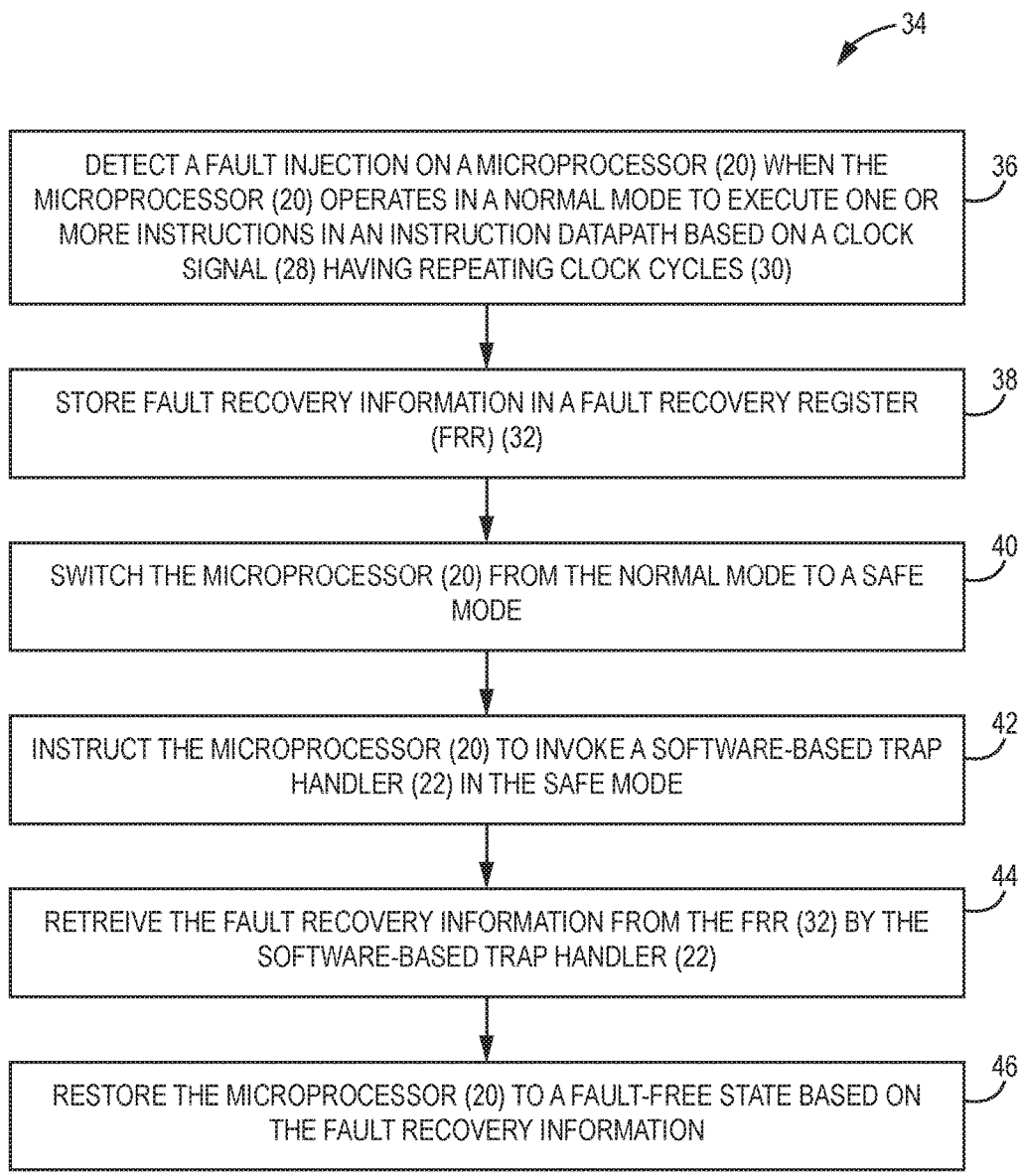
FIG. 3 is a flowchart of an exemplary process that can be employed by the microprocessor fault detection and response system of FIG. 2 to protect the microprocessor from a malicious fault injection.

The microprocessor fault detection and response system 16 may be configured to protect the microprocessor 20 from fault injections based on a process. In this regard, FIG. 3 is a flowchart of an exemplary process 34 that can be employed by the microprocessor fault detection and response system 16 of FIG. 2 to protect the microprocessor 20 from a fault injection.

According to the process 34, the hardware-based FAME 18 detects the fault injection on the microprocessor 20 when the microprocessor 20 operates in the normal mode to execute the instructions in the instruction datapath based on the clock signal 28 that has the repeating clock cycles 30 (block 36). The hardware-based FAME 18 stores the fault recovery information in the FRR 32 (block 38). The hardware-based FAME 18 switches the microprocessor 20 from the normal mode to the safe mode (block 40). Notably, the hardware-based FAME 18 may be configured to switch the microprocessor 20 to the safe mode immediately upon detecting the fault injection and prior to storing the fault recovery information in the FRR 32. Next, the hardware-based FAME 18 instructs the microprocessor 20 to invoke the software-based trap handler 22 in the safe mode (block 42). The software-based trap handler 22 in turn retrieves the fault recovery information from the FRR 32 (block 44). Accordingly, the software-based trap handler 22 restores the microprocessor 20 to the fault-free state based on the fault recovery information (block 46).

With reference back to FIG. 2, the microprocessor fault detection and response system 16 is configured to protect a secure application running on the microprocessor 20 from a malicious adversary who may apply stress on the execution environment of the microprocessor 20, using any common fault injection mechanism. In some cases, the adversary may be able to observe the response of the microprocessor 20 to the fault injection through standard communication channels (e.g., Internet).

To launch a successful fault attack on the microprocessor 20, the adversary would need to be able to control the fault injection, predict effects of the fault injection on execution of the secure application, and test the prediction by observing actual effects of the fault injection on the execution of the secure application. In this regard, the microprocessor fault detection and response system 16 is configured to detect the fault injection in the hardware domain 24 to prevent the adversary from imposing the expected fault effects on the execution of the secure application. Further, the microprocessor fault detection and response system 16 prevents the adversary from observing the actual fault effects through a fault response in the software domain 26.

Figure 4:
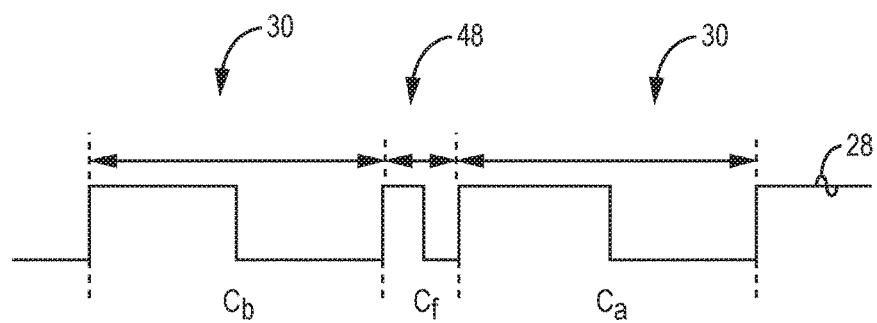
FIG. 4 is a schematic diagram providing an exemplary illustration of a clock glitch that can cause the microprocessor of FIG. 2 to malfunction.

As previously stated, in the normal mode, the microprocessor 20 executes the instructions in the instruction datapath based on the clock signal 28 that has the repeating clock cycles 30. As such, the adversary may launch the malicious fault attack against the microprocessor 20 by injecting a clock glitch in the clock signal 28. In a non-limiting example, the adversary may introduce the fault in the microprocessor 20 by introducing a clock signal glitch, introducing a voltage glitch (e.g., voltage spike), or introducing glitch currents by means of an electromagnetic (EM) field. In this regard, FIG. 4 is a schematic diagram providing an exemplary illustration of a clock glitch that can cause the microprocessor 20 of FIG. 2 to malfunction. Common elements between FIGS. 2 and 4 are shown therein with common element numbers and will not be re-described herein.

In a non-limiting example, the clock glitch may temporarily produce a shortened clock cycle 48 that is shorter than the repeating clock cycles 30. The clock glitch can result in a timing violation in the shortened clock cycle 48, thus causing the microprocessor 20 to malfunction.

As shown in FIG. 4, the clock glitch is injected into the clock signal 28 during a fault cycle $C_f$. Accordingly, a clock cycle immediately preceding the fault cycle $C_f$ and a clock cycle immediately following the fault cycle $C_f$ can be referred to as a before-fault cycle $C_b$ and an after-fault cycle $C_a$, respectively. In this regard, the microprocessor 20 is in the fault-free state in the before-fault cycle $C_b$ and becomes faulty starting from the fault cycle $C_f$. Accordingly, to restore the microprocessor 20 to the fault-free state, the software-based trap handler 22 needs to restore the status quo of the microprocessor 20 during the before-fault cycle $C_b$.

With reference back to FIG. 2, in a non-limiting example, the hardware-based FAME 18 includes a hardware-based fault detection unit (FDU) 50 and a hardware-based fault control unit (FCU) 52. The hardware-based FDU 50 is configured to detect the fault injection on the microprocessor 20 when the microprocessor 20 operates in the normal mode. The hardware-based FDU 50 will generate an alarm signal 54 in response to detecting the fault injection and provide the alarm signal 54 to the hardware-based FCU 52.

The hardware-based FCU 52 may acknowledge the alarm signal 54 received from the hardware-based FDU 50. Accordingly, the hardware-based FCU 52 is configured to store the fault recovery information in the FRR 32 and switch the microprocessor 20 from the normal mode to the safe mode. Notably, the hardware-based FCU 52 may switch the microprocessor 20 to the safe mode before or after storing the fault recovery information in the FRR 32.

To help prevent the fault injection from spreading, the hardware-based FCU 52 may further annul the instructions being executed by the microprocessor 20 in the instruction datapath and disable write operation to the FRR 32. Subsequently, the hardware-based FCU 52 instructs the microprocessor 20 to invoke the software-based trap handler 22 in the safe mode. Upon restoring the microprocessor 20 to the fault-free state, the hardware-based FCU 52 can switch the microprocessor 20 from the safe mode back to the normal mode.

Figure 5:
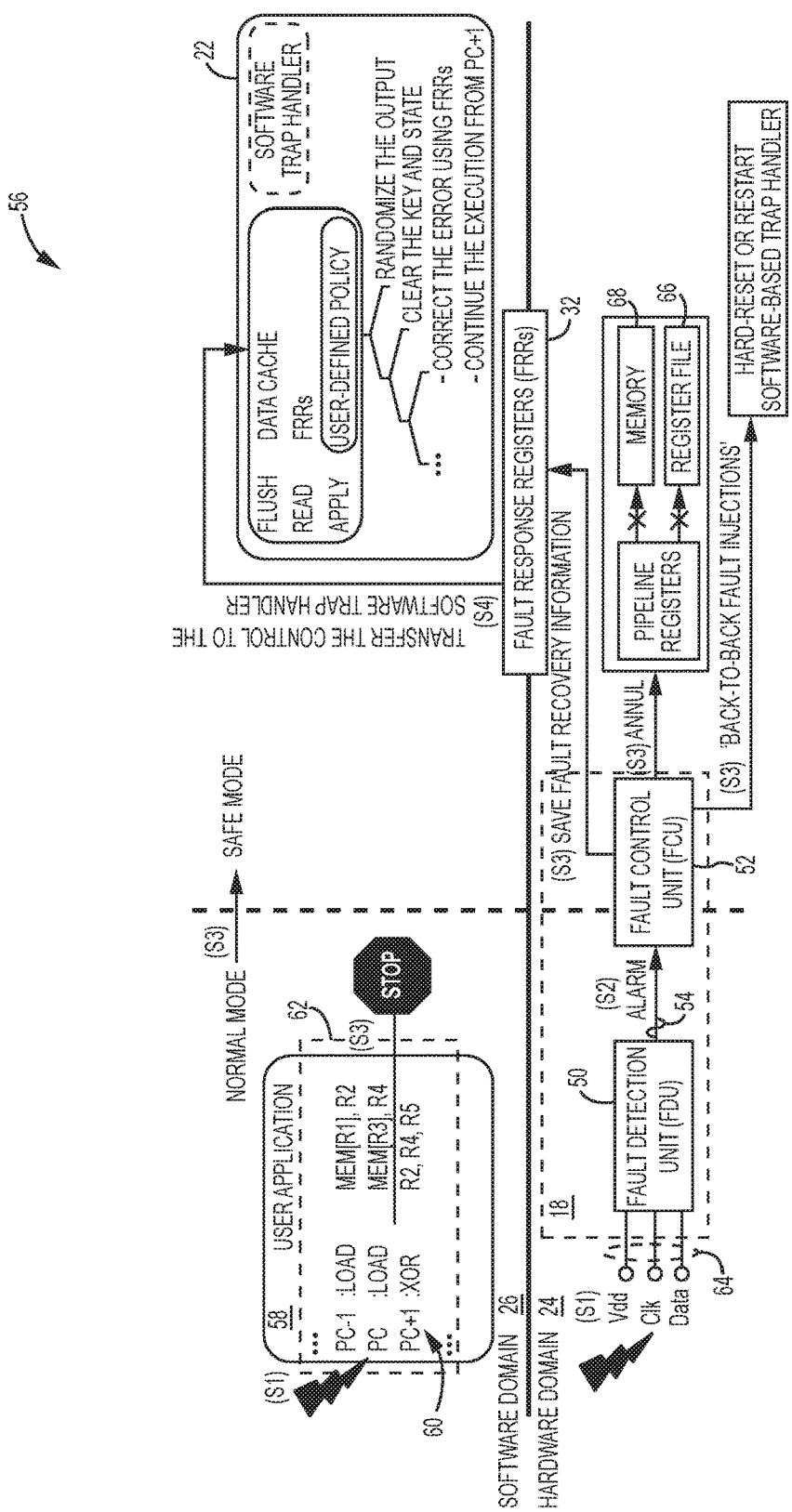
FIG. 5 is a schematic diagram illustrating an exemplary operational flow of the microprocessor fault detection and response system of FIG. 2.

The overall architecture and operation principles of the microprocessor fault detection and response system 16 can be further illustrated and described with reference to FIG. 5. In this regard, FIG. 5 is a schematic diagram illustrating an exemplary operational flow 56 of the microprocessor fault detection and response system 16 of FIG. 2. Common elements between FIGS. 2 and 5 are shown therein with common element numbers and will not be re-described herein.

The operational flow 56 includes four operational phases labeled S1, S2, S3, and S4, respectively. In phase S1, the microprocessor 20 is in the normal mode and a user application 58 is running on the microprocessor 20. In this regard, the microprocessor 20 executes one or more instructions 60 in an instruction datapath 62. Concurrently, the hardware-based FDU 50 monitors the microprocessor 20 to detect potential anomalies. In a non-limiting example, the hardware-based FDU 50 derives a fault status of the microprocessor 20 by combining one or more fault detection inputs 64 from different fault detectors, such as clock/voltage glitch detectors, concurrent error detection methods, shadow latches in the datapath, and error check codes in main memory. The detector configuration of the hardware-based FDU 50 may depend on the user application 58 and desired level of fault sensitivity. Upon detection of the fault injection, the microprocessor fault detection and response system 16 enters phase S2, in which the hardware-based FDU 50 asserts the alarm signal 54 to notify the hardware-based FCU 52 about the fault injection. In phase S2, the hardware-based FDU 50 may also notify the microprocessor 20 about a potential fault attack.

The hardware-based FCU 52 receives and acknowledges the alarm signal 54. At this point, the microprocessor fault detection and response system 16 transitions into phase S3, in which the hardware-based FCU 52 takes immediate action in the hardware domain 24. Specifically, the hardware-based FCU 52 saves the fault recovery information into the FRR 32, annuls the instructions 60 being executed in the instruction datapath 62, and disables write operations into a register file 66 and a memory 68. By doing so, the hardware-based FCU 52 enables two essential capabilities in the microprocessor fault detection and response system 16. First, the hardware-based FCU 52 enables the software-based trap handler 22 to recover the faulty parts of the software-visible state that are contaminated before the alarm signal 54 is generated. Second, the hardware-based FCU 52 prevents any further faulty result from being committed to the architectural state of the microprocessor 20 after the alarm signal 54 is generated. In addition, the hardware-based FCU 52 stops execution of the user application 58, initiates a non-maskable secure trap, and switches the microprocessor 20 from the normal mode to the safe mode. Notably, switching to the safe mode can be done immediately in the after-fault cycle $C_a$ of FIG. 4. In this safe mode, the microprocessor 20 is aware of the fault injection and can securely handle effects of the fault injection through the software-based trap handler 22.

A back-to-back fault injection may occur while the microprocessor 20 is in the safe mode and the software-based trap handler 22 is attempting to restore the microprocessor 20 to the fault-free state. As such, it is necessary for the hardware-based FDU 50 to detect the back-to-back fault injection while the microprocessor 20 is in the safe mode. The hardware-based FDU 50 may once again assert the alarm signal 54 to notify the hardware-based FCU 52 in response to detecting the back-to-back fault injection. In response, the hardware-based FCU 52 may instruct the microprocessor 20 to re-invoke the software-based trap handler 22 or to reset (e.g., hard-reset, warm-reset, cold-reset, etc.) the microprocessor 20.

The FRR 32 contains the fault recovery information, which is the minimum information required by the software-based trap handler 22 for recovering the fault injection and returning control to the microprocessor 20 upon restoring the microprocessor 20 to the fault-free state. In a non-limiting example, the fault recovery information stored in the FRR 32 includes a return address to the interrupted user application 58, a status register of the microprocessor 20, and register-file inputs for write-back. The software-based trap handler 22 may use the fault recovery information to restore the microprocessor 20 to the fault-free state.

The microprocessor fault detection and response system 16 enters phase S4 when control is passed from the hardware-based FCU 52 to the software-based trap handler 22. In phase S4, the software-based trap handler 22 may first flush a data cache to wipe out possible faulty data. Next, the software-based trap handler 22 may restore the microprocessor 20 to the fault-free state based on the fault recovery information stored in the FRR 32. Subsequently, the software-based trap handler 22 may apply a user-defined fault response policy 69. Security of the software-based trap handler 22 may be provided by traditional fault-tolerance countermeasures as described in FIG. 1. However, since the size of the software-based trap handler 22 is much smaller than the size of the user application 58, the cost of using the traditional fault-tolerance countermeasures to secure the software-based trap handler 22 is affordable. Moreover, the security policy for protecting the software-based trap handler 22 may be adjusted according to cost and security requirements of the user application 58.

As discussed above, the microprocessor fault detection and response system 16 uses the fault detection inputs 64 that are combined into the alarm signal 54. The alarm signal 54 initiates a software trap to decide on the further course of action. The microprocessor fault detection and response system 16 provides support in the hardware domain 24 to maintain the fault recovery information. The software-based trap handler 22 determines whether it is safe to continue execution or not. In addition, the microprocessor fault detection and response system 16 ensures that the trap handling mechanism is protected from faults.

Figure 6:
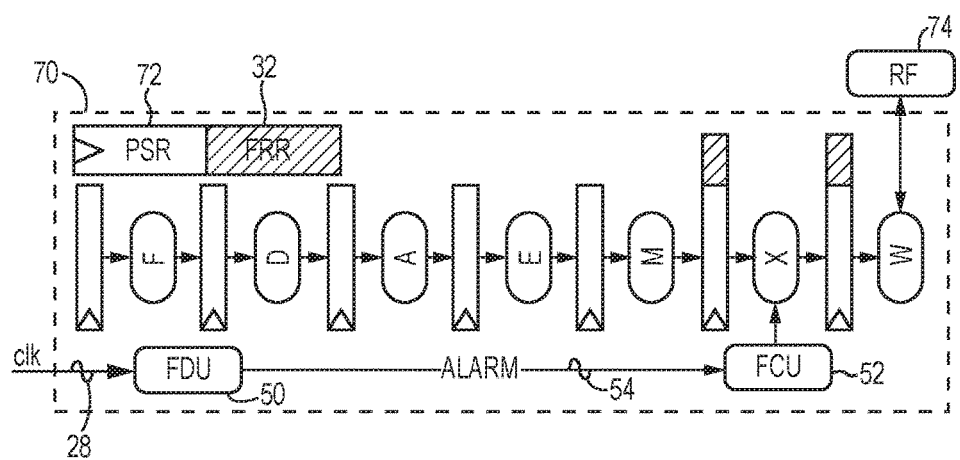
FIG. 6 is a schematic diagram providing an exemplary illustration of a seven-stage instruction datapath that may be employed by the microprocessor of FIG. 2.

In a non-limiting example, the microprocessor 20 can be a LEON3 microprocessor with a seven-stage datapath, as shown in FIG. 6. In this regard, FIG. 6 is a schematic diagram providing an exemplary illustration of a seven-stage instruction datapath 70 that may be employed by the microprocessor 20 of FIG. 2. Common elements between FIGS. 2 and 6 are shown therein with common element numbers and will not be re-described herein.

The seven-stage instruction datapath 70 includes a fetch stage F, a decode stage D, a register access stage A, an execute stage E, a memory stage M, an exception stage X, and a write-back stage W. In a non-limiting example, the microprocessor 20 updates a processor status register (PSR) 72 and a register file (RF) 74 in the write-back stage W. In addition, the microprocessor 20 computes the return address for the software-based trap handler 22 in the exception stage X. As such, the hardware-based FCU 52 may be integrated into the exception stage X. Accordingly, the hardware-based FDU 50 needs to generate the alarm signal 54 prior to the exception stage X, and the hardware-based FCU 52 needs to instruct the microprocessor 20 to invoke the software-based trap handler 22 prior to the write-back stage W.

Exemplary implementations of the hardware-based FDU 50, the hardware-based FCU 52, the FRR 32, and the software-based trap handler 22 are further described below with reference to FIGS. 7-10, respectively. Common elements between FIGS. 2, 4-6, and 7-10 are shown therein with common element numbers and will not be re-described herein.

Figure 7:
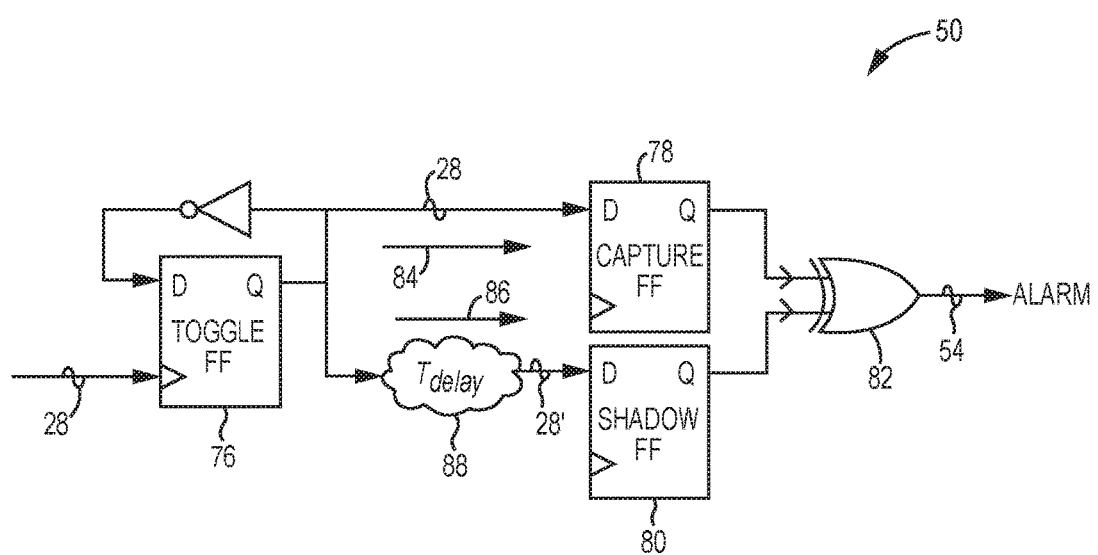
FIG. 7 is a schematic diagram providing an exemplary illustration of a hardware-based fault detection unit (FDU) that may be provided in the hardware-based FAME of FIG. 2 for detecting a malicious fault injection.

FIG. 7 is a schematic diagram providing an exemplary illustration of the hardware-based FDU 50 of FIG. 2. In a non-limiting example, the hardware-based FDU 50 as illustrated in FIG. 7 is configured to detect the clock glitch that causes the shortened clock cycle 48 in the clock signal 28. The hardware-based FDU 50 includes a toggle flip-flop (FF) 76, a capture FF 78, a shadow FF 80, and an exclusive-OR (XOR) gate 82. The toggle FF 76 receives the clock signal 28 and provides the received clock signal 28 to the capture FF 78 along a critical path 84 and to the shadow FF 80 along a delay path 86. The clock signal 28 arrives at the capture FF 78 after a normal delay $T_{critical}$ that is inherent to the critical path 84. The delay path 86 includes delay circuitry 88, which may be implemented as a buffer, configured to add a propagation delay $T_{delay}$ to the clock signal 28 between the toggle FF 76 and the shadow FF 80 to generate a delayed clock signal 28'. The propagation delay $T_{delay}$, which is configured to be slightly longer than the normal delay $T_{critical}$, causes the delayed clock signal 28' to arrive at the shadow FF 80 slightly after the normal delay $T_{critical}$.

The propagation delay $T_{delay}$ may be determined based on a static timing analysis (STA) with worst-case condition (WC) (STA-WC). Notably, it may also be possible to use more advanced techniques, such as representative critical path synthesis, to capture the clock glitch in the synthesis of the delay path 86. In a non-limiting example, the propagation delay $T_{delay}$ is configured to be greater than the longest execution delay of a pipeline stage in the seven-stage instruction datapath 70. For example, if respective execution times of the fetch stage F, the decode stage D, the register access stage A, the execution stage E, the memory stage M, the exception stage X, and the write-back stage W are 1.0 nanosecond (ns), 1.1 ns, 0.9 ns, 1.2 ns, 0.6 ns, 1.0 ns, and 1.0 ns, respectively, the propagation delay $T_{delay}$ would be 1.2 ns. In addition, the propagation delay $T_{delay}$ is further configured to be less than a normal duration of each of the repeating clock cycles 30.

The toggle FF 76 toggles the clock signal 28 in each of the repeating clock cycles 30. As discussed above, the delayed clock signal 28' arrives at the shadow FF 80 slightly after the clock signal 28 arrives at the capture FF 78. When the microprocessor 20 operates in the normal mode without the fault injection, the clock signal 28 received by the capture FF 78 and the delayed clock signal 28' received by the shadow FF 80 both toggle to a new value before a clock edge of the next clock cycle among the repeating clock cycles 30. In contrast, if the fault injection has caused the shortened clock cycle 48 in the clock signal 28, the capture FF 78 would latch the clock signal 28 to the new value before the clock edge of the next clock cycle, while the shadow FF 80 would not toggle because the shortened clock cycle 48 is insufficient for the delay path 86 to transition the delayed clock signal 28' to the new value. Therefore, the XOR gate 82 can generate the alarm signal 54 in the after-fault cycle $C_a$ immediately succeeding the fault cycle $C_f$ among the repeating clock cycles 30. Thus, by adjusting the propagation delay $T_{delay}$ to be slightly longer than the normal delay $T_{critical}$, it may be possible for the hardware-based FDU 50 to reliably detect the fault injection on the microprocessor 20.

Figure 8A:
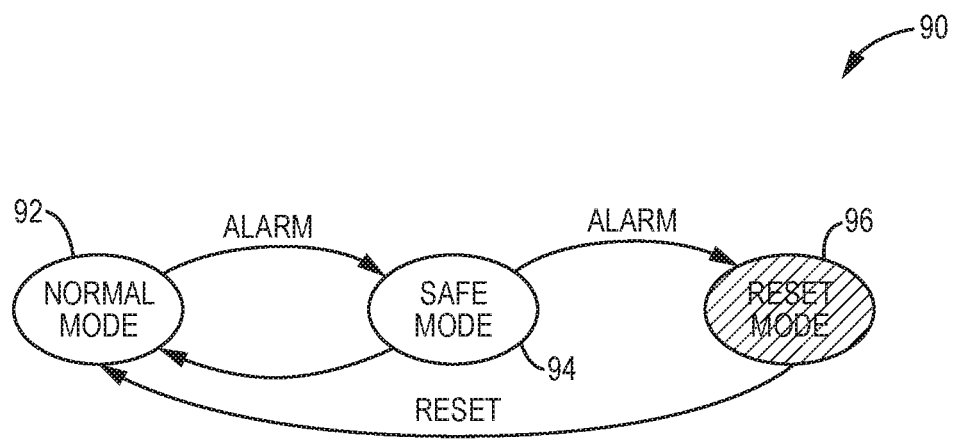
FIGS. 8A and 8B are schematic diagrams providing exemplary illustrations of a state machine that may be employed by a hardware-based fault control unit (FCU) in the hardware-based FAME of FIG. 2 to securely trap a malicious fault injection.
Figure 8B:
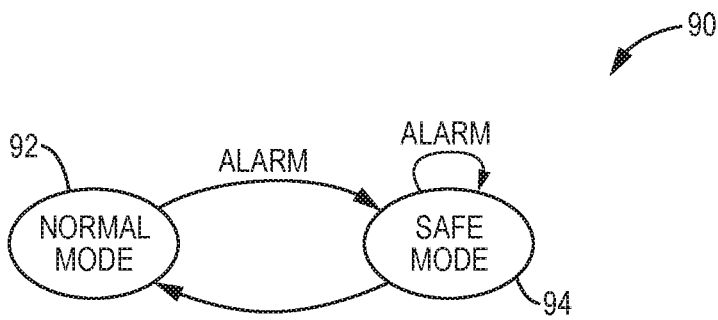

FIGS. 8A and 8B are schematic diagrams providing exemplary illustrations of a state machine 90 that may be employed by the hardware-based FCU 52 to securely trap the fault injection. As shown in FIG. 8A, the hardware-based FCU 52 operates in a first state 92 when the microprocessor 20 operates in the normal mode running the user application 58 in absence of the alarm signal 54. In response to receiving the alarm signal 54 from the hardware-based FDU 50, the hardware-based FCU 52 transitions into a second state 94, in which the hardware-based FCU 52 switches the microprocessor 20 to the safe mode. Specifically, the hardware-based FCU 52 annuls the instructions 60 in the instruction datapath 62, disables all memory and register file transfers of the user application 58, saves the fault recovery information into the FRR 32, and instructs the microprocessor 20 to invoke the software-based trap handler 22 in the safe mode. Concurrently, the hardware-based FDU 50 would reassert the alarm signal 54 in response to detecting the back-to-back fault injection.

If the software-based trap handler 22 restores the microprocessor 20 to the fault-free state and the hardware-based FDU 50 does not reassert the alarm signal 54 to indicate the back-to-back fault injection, the hardware-based FCU 52 returns to the first state 92 and switches the microprocessor 20 back to the normal mode to continue execution of the user application 58. However, if the hardware-based FDU 50 reasserts the alarm signal 54 to indicate the back-to-back fault injection, the hardware-based FCU 52 may transition into a third state 96. Accordingly, the hardware-based FCU 52 can reset the microprocessor 20 then return to the first state 92. In this regard, the microprocessor 20 may restart execution of the user application 58 in the normal mode.

As an alternative to resetting the microprocessor 20 in the event of the back-to-back fault injection, the hardware-based FCU 52 may remain in the second state 94, as shown in FIG. 8B. In this regard, the hardware-based FCU 52 can instruct the microprocessor 20 to re-invoke the software-based trap handler 22 to restore the microprocessor 20 to the fault-free state in the safe mode. It should be appreciated that the hardware-based FCU 52 may be configured to first instruct the microprocessor 20 to re-invoke the software-based trap handler 22 in the event of the back-to-back fault injection, and subsequently reset the microprocessor 20 if the software-based trap handler 22 is unable to restore the microprocessor 20 to the fault-free state.

Figure 9:
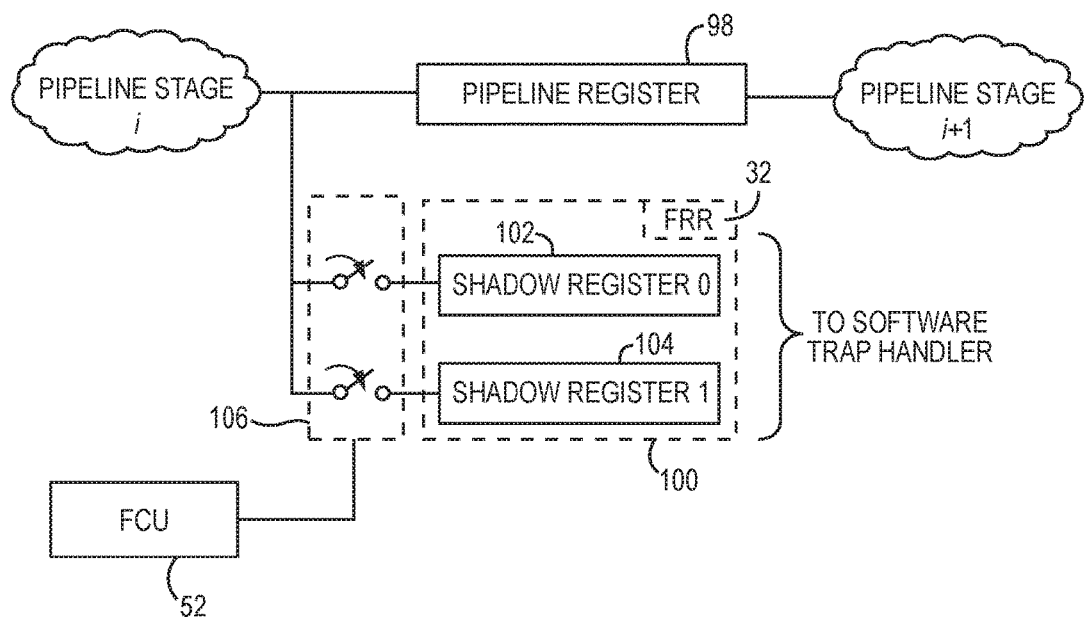
FIG. 9 is a schematic diagram providing an exemplary illustration of a fault recovery register (FRR) that may be provided in the hardware-based FAME of FIG. 2 for securely passing fault recovery information.

FIG. 9 is a schematic diagram providing an exemplary illustration of the FRR 32 of FIG. 2 for securely passing the fault recovery information from the hardware-based FCU 52 to the software-based trap handler 22. As previously discussed, the microprocessor 20 executes the instructions 60 in the instruction datapath 62 based on the clock signal 28 having the repeating clock cycles 30. In this regard, if clock cycle N is a current clock cycle, then clock cycle N−1 and clock cycle N+1 can be referred to as a previous clock cycle and a next clock cycle, respectively.

In one exemplary embodiment, the microprocessor fault detection and response system 16 is configured to include a pipeline register 98 and a shadow register pair 100. The shadow register pair 100 includes a first shadow register 102 and a second shadow register 104. The pipeline register 98 stores the current state of the microprocessor 20 in the current clock cycle N. A first selected shadow register, for example the first shadow register 102, among the shadow register pair 100 is configured to store the current state of the microprocessor 20 as stored in the pipeline register 98. A second selected shadow register, for example the second shadow register 104, among the shadow register pair 100 is configured to store the previous state of the microprocessor 20 in the previous clock cycle N−1.

During the next clock cycle N+1, the clock cycle N becomes the previous clock cycle. Accordingly, the pipeline register 98 is updated to store the new current state of the microprocessor 20 in the clock cycle N+1. Concurrently, the second selected shadow register is updated to store the new current state as now stored in the pipeline register 98, while the first selected shadow register remains unchanged. As such, the first selected shadow register now stores the previous state of the microprocessor 20. In this regard, the first selected shadow register and the second selected shadow register are updated alternately along with a progression of the repeating clock cycles 30. In any given clock cycle among the repeating clock cycles 30, one of the shadow registers in the shadow register pair 100 will store the current state of the microprocessor 20, while the other shadow register in the shadow register pair 100 stores the previous state of the microprocessor 20.

The hardware-based FCU 52 is configured to keep track of the shadow register storing the previous state of the microprocessor 20. In response to receiving the alarm signal 54 from the hardware-based FDU 50, the hardware-based FCU 52 selects the shadow register storing the previous state of the microprocessor 20 to function as the FRR 32. The hardware-based FCU 52 may toggle between the first shadow register 102 and the second shadow register 104 via switch circuitry 106.

In another exemplary embodiment, the second shadow register 104 is be removed from the microprocessor fault detection and response system 16 to help reduce the footprint of the microprocessor fault detection and response system 16. As such, the microprocessor fault detection and response system 16 no longer includes the shadow register pair 100. Accordingly, the first shadow register 102 is configured to always store the previous state of the microprocessor 20. Accordingly, the hardware-based FCU 52 selects the first shadow register 102 to function as the FRR 32 in response to receiving the alarm signal 54.

Figure 10:
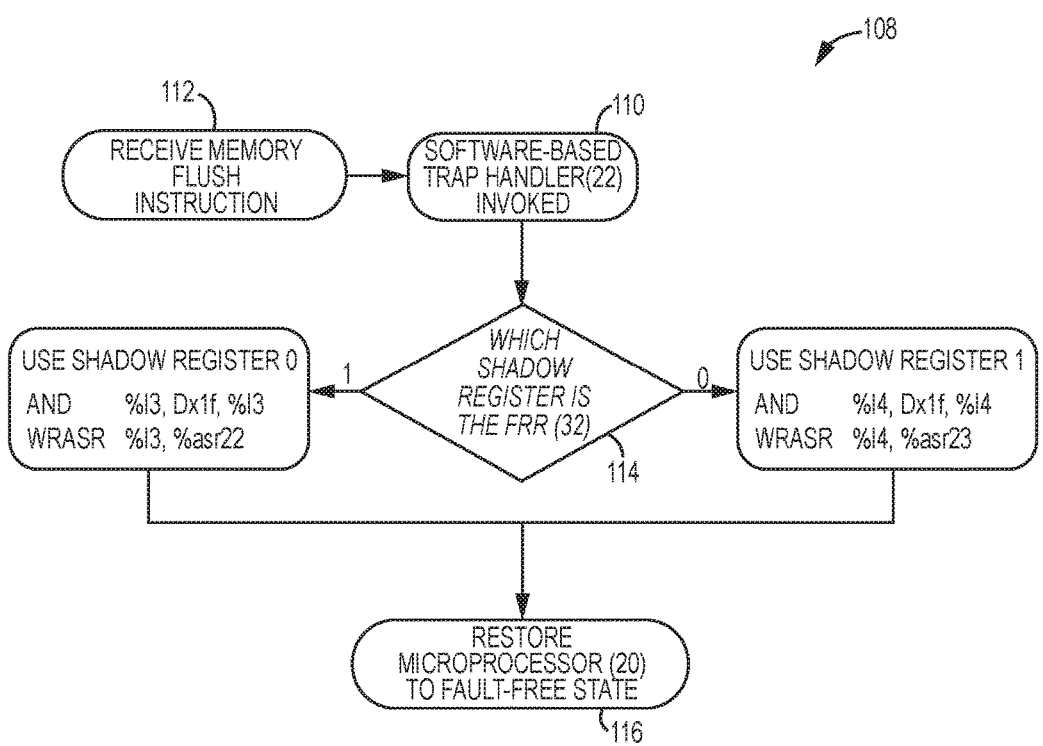
FIG. 10 is a flowchart of an exemplary process that may be employed by a software-based trap handler in the microprocessor fault detection and response system of FIG. 2 for restoring the microprocessor to a fault-free state.

FIG. 10 is a flowchart of an exemplary process 108 that may be employed by the software-based trap handler 22 for restoring the microprocessor 20 of FIG. 2 to the fault-free state. The software-based trap handler 22 is given control of the microprocessor 20 upon being invoked by the microprocessor 20 (block 110). The software-based trap handler 22 receives a memory flush instruction (block 112). The memory flush instruction ensures all invalidated memory in the cache is dumped and not used. Next, the software-based trap handler 22 determines which shadow register in the shadow register pair 100 has been configured to function as the FRR 32 (block 114). In a non-limiting example, the software-based trap handler 22 may read register % asr 20-21 using instruction RDASR. Accordingly, the software-based trap handler 22 may check a bufsel bit in the register % asr 20-21 to determine which of the shadow registers 102, 104 in the shadow register pair 100 has been configured to function as the FRR 32. If the bufsel bit is not set, for example, the software-based trap handler 22 may arbitrarily select the first shadow register 102 as the FRR 32. Accordingly, the software-based trap handler 22 retrieves the fault recovery information from the FRR 32 and restores the microprocessor 20 to the fault-free state (block 116).

The importance of the flexibility provided by the software-based trap handler 22 becomes more significant at higher abstraction levels such as protocol or algorithm level. For example, the microprocessor 20 can be busy with multiple transactions over a standard established connection to a server. These transactions contain several sessions, each having an encryption function with a predefined key. In the case of detecting a fault during a session, the software-based trap handler 22 can take several actions. A lower-level security policy could allow the notification of two parties on two sides of a connection. A medium-level security policy could restore the correct status of the microprocessor 20 before the fault injection and continue the encryption algorithm. A higher-level security policy may require changing the session key and restarting the session or aborting the connection. Similarly, the security requirements can be adjusted dynamically depending on the severity of the fault injection. For example, the lower-level security policy can be applied in the first invocation of the software-based trap handler 22, while the higher-level security policy is applied in subsequent invocations of the software-based trap handler 22.

Figure 11:
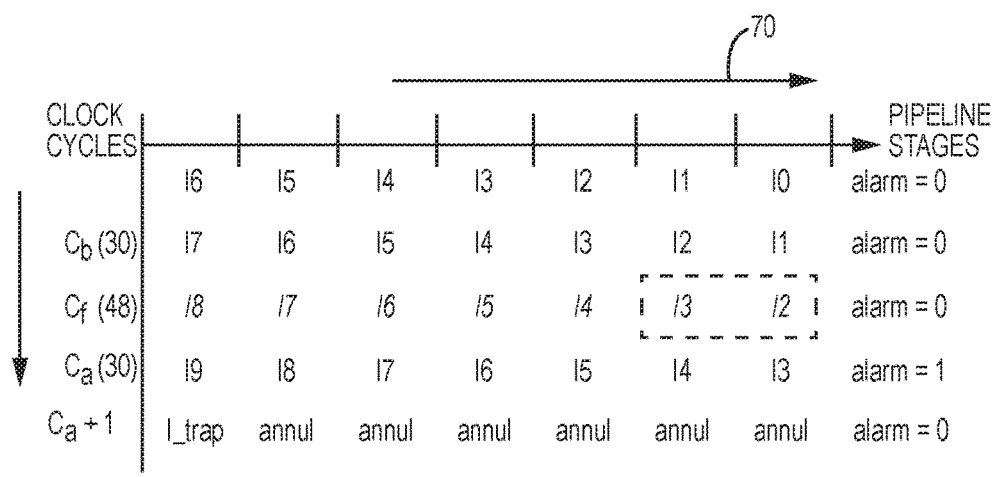
FIG. 11 is a schematic diagram providing an exemplary illustration of effects of the clock glitch of FIG. 4 on the seven-stage instruction datapath of FIG. 6.

As previously discussed with reference to FIG. 4, the fault injection may temporarily produce the shortened clock cycle 48 that can result in the timing violation in the shortened clock cycle 48, thus causing the microprocessor 20 to malfunction. Further, as discussed with reference to FIG. 6, the hardware-based FCU 52 may be integrated into the exception stage X of the seven-stage instruction datapath 70. As such, it may be possible to determine the content of the FRR 32 by analyzing the effect of the shortened clock cycle 48 on executions in the seven-stage instruction datapath 70. In this regard, FIG. 11 is a schematic diagram providing an exemplary illustration of the effects of the clock glitch of FIG. 4 on the seven-stage instruction datapath 70 of FIG. 6. Common elements between FIGS. 4, 6, and 11 are shown therein with common element numbers and will not be re-described herein.

In FIG. 11, the before-fault cycle $C_b$, the fault cycle $C_f$, and the after-fault cycle $C_a$ progress from top to bottom, while instructions in the seven-stage instruction datapath 70 run from left to right. In the fault cycle $C_f$, up to seven instructions I2-I8, may be potentially faulty. During the fault cycle $C_f$, two instructions may commit respective results to the software-visible state of the microprocessor 20. First, the instruction I4 may write a faulty value to the data cache. Second, the instruction I2 may update the PSR 72 and the RF 74 with a faulty value. Both of these potential updates need to be intercepted and corrected by the software-based trap handler 22. Then, the microprocessor 20 may resume execution from the next valid instruction I3. As such, the FRR 32 needs to keep the RF write address, write data, and write enable fields of the write-back stage registers, flag fields of the PSR 72, and the instruction being executed in the exception stage X in the fault cycle $C_f$.

After control is passed to the software-based trap handler 22, the software-based trap handler 22 reads frozen content from the FRR 32. At a minimum level, the software-based trap handler 22 restores the microprocessor 20 to the fault-free state. In addition, the software-based trap handler 22 may further apply a user-defined security policy (e.g., the lower-level/medium-level/higher-level security policy in FIG. 10) in the safe mode.

To help evaluate hardware overhead associated with the microprocessor fault detection and response system 16 of FIGS. 2 and 5, an experiment was conducted by integrating the microprocessor fault detection and response system 16 into a Xilinx Spartan6 (XC6SLX75) field-programmable gate array (FPGA). Area and timing results were obtained respectively for a LEON3 implementation without the microprocessor fault detection and response system 16, a LEON3 implementation with the hardware-based FCU 52 and the FRR 32, and a LEON3 implementation with the hardware-based FDU 50, the hardware-based FCU 52, and the FRR 32.

The experiment shows that a maximum operating frequency of all implementations is 62.5 MHz. This result illustrates that the microprocessor fault detection and response system 16 incurs no timing overhead. Area results obtained from the experiment are summarized in Table 1 below.

TABLE 1

|  | #Slice LUTs | | #Slice Regs | |
| --- | --- | --- | --- | --- |
|  | Total | Overhead | Total | Overhead |
| LEON3 | 3435 | — | 1275 | — |
| LEON3 + FCU + FRR | 3691 | 256 | 1456 | 181 |
| LEON3 + FDU + FCU + FRR | 3744 | 309 | 1459 | 184 |

As shown in Table 1, adding the hardware-based FCU 52 and the FRR 32 caused 7.4% and 14.2% increases in the number of look-up-tables (LUTs) and FFs, respectively. Adding the hardware-based FDU 50 incurred additional 1.5% and 1% increases in the number of LUTs and FFs, respectively. As a result, the microprocessor fault detection and response system 16 can protect the microprocessor 20 from malicious fault attacks without any timing overhead and with a low area overhead.

Table 2 below summarizes overhead of the software-based trap handler 22 in terms of clock cycles and code footprint (number of instructions). To help evaluate software overhead associated with the software-based trap handler 22, two different security policies were implemented to protect an advanced encryption standard (AES) application. The first security policy restored the pre-fault status of the AES application and resumed encryption, with results shown in the Resume column of Table 2. The second security policy reset the microprocessor 20 and started a new encryption with a different key, with the results shown in the KeyChange column of Table 2.

TABLE 2

|  | AES | Resume | | KeyChange | |
| --- | --- | --- | --- | --- | --- |
|  | (Unprotected) | Total | Overhead | Total | Overhead |
| Cycles | 131627 | 134159 | 1% | 180775 | 37% |
| Instructions | 96826 | 97059 | 0.24% | 130584 | 34% |

For each detected fault injection, the overhead of resuming the encryption (Resume) in performance and footprint was 1% and 0.24%, respectively. The performance and footprint overhead for starting the new encryption with the different key (KeyChange) was 34% and 37%, respectively. However, research shows that the performance overhead of well-known software countermeasures for full protection of an AES is 97%-239%, and footprint overhead is 89.9%-200%. As such, the software overhead of the microprocessor fault detection and response system 16 is much lower compared to other software techniques. This is because code redundancy in other software techniques is always executed even if no fault injection attempt happens. In contrast, the microprocessor fault detection and response system 16 only invokes the software-based trap handler 22 when the hardware-based FAME 18 detects the fault injection.

Those skilled in the art will recognize improvements and modifications to the preferred embodiments of the present disclosure. All such improvements and modifications are considered within the scope of the concepts disclosed herein and the claims that follow.

What is claimed is:

1. A microprocessor fault detection and response system, comprising:
a microprocessor configured to operate in an normal mode and a safe mode; and
a hardware-based fault-attack aware microprocessor extension (FAME) coupled to the microprocessor, the hardware-based FAME configured to:
detect a fault injection on the microprocessor when the microprocessor operates in the normal mode to execute one or more instructions in an instruction datapath based on a clock signal having repeating clock cycles;
store fault recovery information in a fault recovery register (FRR);
switch the microprocessor from the normal mode to the safe mode; and
instruct the microprocessor to invoke a software-based trap handler in the safe mode;
wherein the software-based trap handler is configured to:
retrieve the fault recovery information from the FRR; and
restore the microprocessor to a fault-free state based on the fault recovery information.

2. The microprocessor fault detection and response system of claim 1, wherein the software-based trap handler is further configured to apply a user-defined fault response policy upon restoring the microprocessor to the fault-free state.

3. The microprocessor fault detection and response system of claim 1, wherein the hardware-based FAME is further configured to switch the microprocessor from the safe mode to the normal mode in response to the software-based trap handler restoring the microprocessor to the fault-free state.

4. The microprocessor fault detection and response system of claim 1, further comprising a pipeline register, a first shadow register, and a second shadow register, wherein:
the pipeline register is configured to store a current state of the microprocessor;
the first shadow register and the second shadow register are configured to alternately store the current state and a previous state of the microprocessor in the repeating clock cycles; and
the hardware-based FAME is further configured to select a shadow register storing the previous state of the microprocessor among the first shadow register and the second shadow register to function as the FRR.

5. The microprocessor fault detection and response system of claim 1, further comprising a pipeline register and a shadow register, wherein:
the pipeline register is configured to store a current state of the microprocessor;
the shadow register is configured to store a previous state of the microprocessor; and
the hardware-based FAME is further configured to select the shadow register to function as the FRR.

6. The microprocessor fault detection and response system of claim 1, wherein the hardware-based FAME comprises:
a hardware-based fault detection unit (FDU) configured to detect the fault injection on the microprocessor when the microprocessor operates in the normal mode; and
a hardware-based fault control unit (FCU) configured to:
store the fault recovery information in the FRR;
switch the microprocessor from the normal mode to the safe mode; and
instruct the microprocessor to invoke the software-based trap handler in the safe mode.

7. The microprocessor fault detection and response system of claim 6, wherein the hardware-based FCU is further configured to switch the microprocessor from the safe mode to the normal mode in response to the software-based trap handler restoring the microprocessor to the fault-free state.

8. The microprocessor fault detection and response system of claim 6, wherein:
the hardware-based FDU is further configured to detect a back-to-back fault injection while the microprocessor operates in the safe mode; and
the hardware-based FCU is further configured to instruct the microprocessor to re-invoke the software-based trap handler in response to the hardware-based FDU detecting the back-to-back fault injection in the safe mode.

9. The microprocessor fault detection and response system of claim 8, wherein the hardware-based FCU is further configured to reset the microprocessor in response to the hardware-based FDU detecting the back-to-back fault injection in the safe mode.

10. The microprocessor fault detection and response system of claim 6, wherein:
the fault injection causes a clock glitch causing a shortened clock cycle among the repeating clock cycles of the clock signal; and
the hardware-based FDU is further configured to detect the fault injection in a clock cycle immediately succeeding the shortened clock cycle among the repeating clock cycles.

11. The microprocessor fault detection and response system of claim 6, wherein:
the hardware-based FDU is further configured to generate an alarm signal in response to detecting the fault injection; and
the hardware-based FCU is further configured to:
receive and acknowledge the alarm signal generated by the hardware-based FDU;
store the fault recovery information in the FRR;
annul the one or more instructions being executed by the microprocessor in the instruction datapath;
disable write operation to the FRR;
switch the microprocessor from the normal mode to the safe mode; and
invoke the software-based trap handler to execute on the microprocessor in the safe mode.

12. The microprocessor fault detection and response system of claim 11, wherein:
the instruction datapath of the microprocessor comprises a fetch stage, a decode stage, a register access stage, an execute stage, a memory stage, an exception stage, and a write-back stage;
the hardware-based FDU is further configured to generate the alarm signal prior to the exception stage; and
the hardware-based FCU is further configured to invoke the software-based trap handler prior to the write-back stage.

13. The microprocessor fault detection and response system of claim 12, wherein the fault recovery information stored in the FRR comprises a return address to an interrupted user application, a status register of the microprocessor, and a register file input of the write-back stage.

14. A method for protecting a microprocessor from fault injections, comprising:
- detecting a fault injection on a microprocessor when the microprocessor operates in a normal mode to execute one or more instructions in an instruction datapath based on a clock signal having repeating clock cycles;
- storing fault recovery information in a fault recovery register (FRR);
- switching the microprocessor from the normal mode to a safe mode;
- instructing the microprocessor to invoke a software-based trap handler in the safe mode;
- retrieving the fault recovery information from the FRR by the software-based trap handler;
- restoring the microprocessor to a fault-free state based on the fault recovery information;
- detecting a back-to-back fault injection while the microprocessor operates in the safe mode; and
- instructing the microprocessor to re-invoke the software-based trap handler in response to detecting the back-to-back fault injection in the safe mode.

15. The method of claim 14, further comprising applying a user-defined fault response policy upon restoring the microprocessor to the fault-free state.

16. The method of claim 14, further comprising switching the microprocessor from the safe mode to the normal mode in response to restoring the microprocessor to the fault-free state.

17. The method of claim 14, further comprising:
- storing a current state of the microprocessor in a pipeline register;
- alternately storing the current state and a previous state of the microprocessor in a first shadow register and a second shadow register in the repeating clock cycles; and
- selecting a shadow register storing the previous state of the microprocessor among the first shadow register and the second shadow register to function as the FRR.

18. The method of claim 14, further comprising:
- storing a current state of the microprocessor in a pipeline register;
- storing a previous state of the microprocessor in a shadow register; and
- selecting the shadow register to function as the FRR.

19. The method of claim 14, further comprising resetting the microprocessor in response to detecting the back-to-back fault injection in the safe mode.

* * * * *